(12) United States Patent
Brady et al.

(10) Patent No.: US 12,092,581 B2
(45) Date of Patent: Sep. 17, 2024

(54) LASER BOND INSPECTION SYSTEM AND METHOD

(71) Applicant: The Boeing Company, Chicago, IL (US)

(72) Inventors: Steven K. Brady, Renton, WA (US); Marc J. Piehl, Renton, WA (US)

(73) Assignee: The Boeing Company, Arlington, VA (US)

(*) Notice: Subject to any disclaimer, the term of this patent is extended or adjusted under 35 U.S.C. 154(b) by 387 days.

(21) Appl. No.: 17/532,351

(22) Filed: Nov. 22, 2021

(65) Prior Publication Data
US 2022/0196563 A1 Jun. 23, 2022

Related U.S. Application Data

(60) Provisional application No. 63/127,126, filed on Dec. 17, 2020.

(51) Int. Cl.
G01N 21/88 (2006.01)
G02B 26/08 (2006.01)

(52) U.S. Cl.
CPC ......... *G01N 21/88* (2013.01); *G02B 26/0816* (2013.01)

(58) Field of Classification Search
CPC ............................ G01N 21/88; G02B 26/0816
USPC ...................................................... 356/237.2
See application file for complete search history.

(56) References Cited

U.S. PATENT DOCUMENTS

| 4,584,879 A | 4/1986 | Webster et al. |
| 6,386,038 B1 | 5/2002 | Lewis, III et al. |
| 6,622,568 B2 | 9/2003 | Nelson et al. |
| 6,848,321 B2 | 2/2005 | Bossi et al. |
| 7,507,312 B2 | 3/2009 | Bossi et al. |
| 7,509,876 B1 | 3/2009 | Sokol et al. |
| 7,735,377 B1 | 6/2010 | Sokol et al. |

(Continued)

FOREIGN PATENT DOCUMENTS

| JP | 2005300273 | 10/2005 | |
| KR | 101179134 | 9/2012 | |
| WO | WO-2011030306 A1 * | 3/2011 | ........... G02B 6/4296 |

OTHER PUBLICATIONS

Virtek laser products, accessed from https://virtekvision.com/ on Nov. 18, 2021.

(Continued)

*Primary Examiner* — Md M Rahman
(74) *Attorney, Agent, or Firm* — Kunzler Bean & Adamson

(57) ABSTRACT

Disclosed herein is a laser bond inspection system that comprises a high-power laser, configured to generate a high-power laser beam having a high energy, and a low-power laser, configured to generate a low-power laser beam having a low energy that is less than the high energy. The laser bond inspection system further comprises a target patch. The laser bond inspection system additionally comprises a beam-aiming optic, configured to receive the low-power laser beam from the low-power laser and redirect the low-power laser beam at the target patch when the target patch is affixed to the part. The laser bond inspection system also comprises an optical sensor, configured to detect a reflected portion of the low-power laser beam reflected off of the target patch. The beam-aiming optic is further configured to receive the high-power laser beam from the high-power laser and redirect the high-power laser beam at the target patch.

20 Claims, 10 Drawing Sheets

(56) References Cited

U.S. PATENT DOCUMENTS

| | | | |
|---|---|---|---|
| 8,225,664 B1 | 7/2012 | Sokol et al. | |
| 8,496,339 B2 | 7/2013 | Nakajima | |
| 10,048,230 B2 | 8/2018 | Stewart et al. | |
| 2002/0096503 A1* | 7/2002 | Hackel | B23K 26/356 219/121.85 |
| 2005/0190427 A1* | 9/2005 | Steinsiek | H02J 50/90 359/528 |
| 2016/0109343 A1* | 4/2016 | Bossi | G01N 29/00 73/800 |
| 2019/0383727 A1 | 12/2019 | Stewart et al. | |
| 2019/0391363 A1* | 12/2019 | Ream | G02B 26/127 |
| 2020/0052454 A1* | 2/2020 | Safai | H01S 3/225 |
| 2020/0110045 A1* | 4/2020 | Safai | G01N 23/04 |
| 2020/0346301 A1* | 11/2020 | Yao | B23K 26/20 |
| 2021/0293760 A1 | 9/2021 | Safai | |
| 2021/0372881 A1* | 12/2021 | Walters | G01M 11/37 |
| 2021/0382210 A1* | 12/2021 | Wright | G02B 19/0023 |
| 2022/0009124 A1* | 1/2022 | Xiao | B33Y 10/00 |
| 2022/0048135 A1* | 2/2022 | Brookhyser | B23K 26/0861 |
| 2022/0289615 A1* | 9/2022 | Wynne | B23K 26/50 |
| 2022/0409275 A1* | 12/2022 | Hoang | A61B 5/14542 |
| 2023/0358633 A1* | 11/2023 | Hay | G01M 11/00 |

OTHER PUBLICATIONS

Aligned Vision products, accessed from https://aligned-vision.com/ on Nov. 19, 2021.

Kobayashi et al., Evaluation of shot peening by AE method, Sintokogio, Ltd., www.sinto.co.jp, 4th International Conference on Laser Peening and Related Phenomena, May 2013, Madrid Spain.

Enoki et al., Quantitative Acoustic Emission Measurement of Laser Peening, 30th European Conference on Acoustic Emission Testing & 7th International Conference on Acoustic Emission, University of Granada, Sep. 12-15, 2012.

Ito et al., Acquisition and Analysis of Continuous Acoustic Emission Waveform for Classification of Damage Sources in Ceramic Fiber Mat, Materials Transactions, vol. 48 No. 06, pp. 1221-1226, 2007.

Raju et al., Characterization of Defects in Graphite Fiber Based Composite Structures Using the Acoustic Impact Technique (AIT), Journal of Testing and Evaluation, 1993, pp. 337-395, vol. No. 5, Philadelphia, PA, US.

International Search Report, Application No. PCT/US2014/059596, dated Feb. 3, 2015.

\* cited by examiner

LASER BOND INSPECTION SYSTEM AND METHOD

FIELD

This disclosure relates generally to inspecting the structural integrity of bonds of a laminated part, and more particularly to locating testing sites on a part and laser bond inspecting the part at the located testing sites.

BACKGROUND

Systems and methods exist for testing the strength of bonds between bonded layers of a laminated part. Some systems and methods are designed to detect the strength of a bond in a non-destructive manner while the bond is in situ or intact. For example, laser bond inspection techniques are used to detect the strength of a bond by transmitting a laser-induced stress wave (e.g., shockwave) through the laminated part. The stress waves are initiated at a top surface as compression waves that convert into tension waves upon reflecting off of a second free surface of the laminated part (which can be a bottom surface of the laminated part). The tension waves apply opposing tension forces onto layers forming bonds to effectively pull the layers, in opposite directions, along the bonds.

Depending on the strength of the laminated part, the application of a laser-induced stress wave into the layers of the laminated part may create defects in the laminated part. These defects will occur at the weakest portion of the laminated part. For example, if a bond is weak or defective, the tension waves are sufficient to pull or separate the layers forming the bond, thus creating a disbond or void at the bondline or an interlaminar delamination.

Disbonds, which are a separation of previously bonded surfaces, interlaminar delaminations, or other defects can be detected using conventional ultrasound techniques. Accordingly, the detection of such defects, using conventional ultrasound techniques after a laser bond inspection process, may be desirable. Some ultrasonic inspection techniques utilize ultrasonic transducers to impart a vibration into a laminated part and measure the resultant feedback vibration. Depending on the characteristics of the feedback vibration, the presence of disbonds (or other abnormalities or defects) and locations of the defects in the part can be determined.

Quickly and efficiently identifying locations on a laminated part and transmitting a laser-induced stress wave into the laminated part at the identified locations can be difficult. Moreover, conventional laser bond inspection techniques are performed using a large inspection head, which can make access to some locations on a laminated part difficult. Additionally, some conventional laser bond inspection assemblies require a flowing layer of water to generate the compression waves at the surface of parts under inspection, which can necessitate complex water delivery and containment measures and introduce water damage issues.

SUMMARY

The subject matter of the present application has been developed in response to the present state of the art, and in particular, in response to the shortcomings of conventional laser bond inspection systems and techniques, which have not yet been fully solved by currently available systems and techniques. Accordingly, the subject matter of the present application has been developed to provide laser bond inspection systems and methods that overcome at least some of the above-discussed shortcomings of the prior art.

Disclosed herein is a laser bond inspection system for inspecting a part. The laser bond inspection system comprises a high-power laser that is configured to generate a high-power laser beam having a high energy. The laser bond inspection system also comprises a low-power laser that is configured to generate a low-power laser beam having a low energy that is less than the high energy. The laser bond inspection system further comprises a target patch that is configured to be affixed to the part. The laser bond inspection system additionally comprises a beam-aiming optic that is configured to receive the low-power laser beam from the low-power laser and redirect the low-power laser beam at the target patch when the target patch is affixed to the part. The laser bond inspection system also comprises an optical sensor that is configured to detect a reflected portion of the low-power laser beam reflected off of the target patch. The beam-aiming optic is further configured to receive the high-power laser beam from the high-power laser and redirect the high-power laser beam at the target patch. The preceding subject matter of this paragraph characterizes example 1 of the present disclosure.

The target patch comprises an ablative portion that is configured to absorb the high-power laser beam. The target patch also comprises a tamping portion that is configured to allow transmission of the high-power laser beam through the tamping portion and to redirect energy absorbed by the ablative portion into the part when the target patch is affixed to the part. The target patch also comprises a retro-reflective portion that is configured to reflect the low-power laser beam. The preceding subject matter of this paragraph characterizes example 2 of the present disclosure, wherein example 2 also includes the subject matter according to example 1, above.

The target patch comprises a first layer that is directly adjacent the part when the target patch is affixed to the part. The first layer comprises the ablative portion. The target patch also comprises a second layer that is affixed to the first layer. The second layer comprises the tamping portion and the retro-reflective portion. The preceding subject matter of this paragraph characterizes example 3 of the present disclosure, wherein example 3 also includes the subject matter according to example 2, above.

The second layer comprises retro-reflective tape that is configured to reflect the low-power laser beam and allow transmission of the high-power laser beam through the retro-reflective tape. The preceding subject matter of this paragraph characterizes example 4 of the present disclosure, wherein example 4 also includes the subject matter according to example 3, above.

The target patch comprises a first layer that is directly adjacent the part when the target patch is affixed to the part. The first layer comprises the ablative portion and the retro-reflective portion. The target patch also comprises a second layer that is affixed to the first layer. The second layer comprises the tamping portion. The preceding subject matter of this paragraph characterizes example 5 of the present disclosure, wherein example 5 also includes the subject matter according to example 2, above.

The target patch comprises a first layer that is directly adjacent the part when the target patch is affixed to the part. The first layer comprises the ablative portion. The target patch also comprises a second layer that is affixed to the first layer. The second layer comprises the retro-reflective portion. The target patch further comprises a third layer that is affixed to the second layer. The third layer comprises the tamping portion. The preceding subject matter of this paragraph characterizes example 6 of the present disclosure, wherein example 6 also includes the subject matter according to example 2, above.

The target patch comprises a first layer that is directly adjacent the part when the target patch is affixed to the part. The first layer comprises the ablative portion. The target patch also comprises a second layer that is affixed to the first layer. The second layer comprises the tamping portion. The target patch further comprises a third layer that is affixed to the second layer. The third layer comprises the retro-reflective portion. The preceding subject matter of this paragraph characterizes example 7 of the present disclosure, wherein example 7 also includes the subject matter according to example 2, above.

The retro-reflective portion has a ring-like shape. The preceding subject matter of this paragraph characterizes example 8 of the present disclosure, wherein example 8 also includes the subject matter according to any one of examples 2-7, above.

The beam-aiming optic comprises an adjustable mirror. The preceding subject matter of this paragraph characterizes example 9 of the present disclosure, wherein example 9 also includes the subject matter according to any one of examples 1-8, above.

The laser bond inspection system further comprises a beam-combining optic that is located relative to the high-power laser beam and the low-power laser beam such that the high-power laser beam is reflected off of the beam-combining optic along a beam path toward the beam-aiming optic and that the low-power laser beam passes through the beam-combining optic along the beam path. The preceding subject matter of this paragraph characterizes example 10 of the present disclosure, wherein example 10 also includes the subject matter according to example 9 above.

Spatial parameters of the beam-aiming optic, relative to the part, when redirecting the low-power laser beam at the target patch and redirecting the high-power laser beam at the target patch, are the same. The preceding subject matter of this paragraph characterizes example 11 of the present disclosure, wherein example 11 also includes the subject matter according to any one of examples 9-10, above.

The laser bond inspection system further comprises an enclosure that encloses the high-power laser beam when generated by the high-power laser, the low-power laser beam when generated by the low-power laser, the target patch when affixed to the part, the beam-aiming optic, and the optical sensor. The enclosure is opaque to the high-power laser beam. The preceding subject matter of this paragraph characterizes example 12 of the present disclosure, wherein example 12 also includes the subject matter according to any one of examples 1-11, above.

The high-power laser beam has a wavelength within the infrared light spectrum. The low-power laser beam has a wavelength within the visible light spectrum. The preceding subject matter of this paragraph characterizes example 13 of the present disclosure, wherein example 13 also includes the subject matter according to any one of examples 1-12, above.

Further disclosed herein is a laser bond inspection system for inspecting a part. The laser bond inspection system comprises a high-power laser that is configured to generate a high-power laser beam having a high energy. The laser bond inspection system also comprises a low-power laser that is configured to generate a low-power laser beam having a low energy that is less than the high energy. The laser bond inspection system further comprises a target patch that is configured to be affixed to the part. The laser bond inspection system additionally comprises a beam-aiming optic that is configured to receive the low-power laser beam from the low-power laser and receive the high-power laser beam from the high-power laser. The laser bond inspection system also comprises an optical sensor. The laser bond inspection system further comprises an electronic controller that is operably coupled with the high-power laser, the low-power laser, the beam-aiming optic, and the optical sensor, and configured to control the low-power laser to generate the low-power laser beam. The electronic controller is also configured to control the beam-aiming optic to move the low-power laser beam, received from the low-power laser beam, along the part until the optical sensor detects a reflected portion of the low-power laser beam reflected off of the target patch. The electronic controller is further configured to control the beam-aiming optic such that, when the beam-aiming optic receives the high-power laser beam from the high-power laser, the high-power laser beam is directed at the detected location of the target patch. The electronic controller is additionally configured to control the high-power laser to generate the high-power laser beam. The preceding subject matter of this paragraph characterizes example 14 of the present disclosure.

The electronic controller is configured to control the beam-aiming optic such that spatial parameters of the beam-aiming optic, relative to the part, when the optical sensor detects the reflected portion of the low-power laser beam, and when beam-aiming optic receives the high-power laser beam, are the same. The preceding subject matter of this paragraph characterizes example 15 of the present disclosure, wherein example 15 also includes the subject matter according to example 14, above.

Additionally disclosed herein is a method of laser bond inspecting a part. The method comprises affixing a target patch to the part at a location to be inspected. The method also comprises directing a low-power laser beam, having a low energy, off of a beam-aiming optic at the part. The method further comprises moving the low-power laser beam along the part, via adjustment of the beam-aiming optic, until the low-power laser beam retro-reflects off of the target patch. The method additionally comprises detecting a reflected portion of the low-power laser beam reflected off of the target patch at an optical sensor. The method also comprises aiming a high-power laser beam, having a high energy higher than the low energy, at the target patch using the beam-aiming optic. The preceding subject matter of this paragraph characterizes example 16 of the present disclosure.

The low-power laser beam reflects off of a retro-reflective portion of the target patch. The method further comprises transmitting the high-power laser beam through a tamping portion of the target patch and absorbing the high-power laser beam, transmitted through the tamping portion, in an ablative portion of the target patch. The preceding subject matter of this paragraph characterizes example 17 of the present disclosure, wherein example 17 also includes the subject matter according to example 16, above.

The method further comprises detecting a distance from the detected location of the target patch to the optical sensor and adjusting an energy level of the high-power laser beam based on a detected distance from the detected location of the target patch to the optical sensor. The preceding subject matter of this paragraph characterizes example 18 of the present disclosure, wherein example 18 also includes the subject matter according to any one of examples 16-17, above.

The beam-aiming optic comprises an adjustable mirror. Moving the low-power laser beam along the part until the low-power laser beam retro-reflects off of the target patch comprises adjusting a spatial parameter of the adjustable mirror to have a final spatial parameter value. Aiming the high-power laser beam comprises reflecting the high-power laser beam off of the adjustable mirror when the adjustable has the final spatial parameter value. The preceding subject matter of this paragraph characterizes example 19 of the present disclosure, wherein example 19 also includes the subject matter according to any one of examples 16-18, above.

Aiming the high-power laser beam comprises directing the high-power laser beam along a high-power-laser beam path that is collinear with a low-power-laser beam path of the low-power laser beam when the low-power laser beam is reflected off of the target patch. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Described herein are systems and method for laser bond inspecting a part that promote quickly and efficiently identifying locations on the part and transmitting a laser-induced stress wave into the part at the identified locations. Additionally, in some examples, the systems for laser bond inspecting a part described herein enable inspection of difficult-to-reach locations on a part. Furthermore, according to certain examples, the systems for laser bond inspecting a part described herein eliminate the requirement of free flowing water, which enables a more simplistic approach to laser bond inspecting parts and eliminates the potential for water damage on the testing equipment and the part under inspection.

Figure 1:
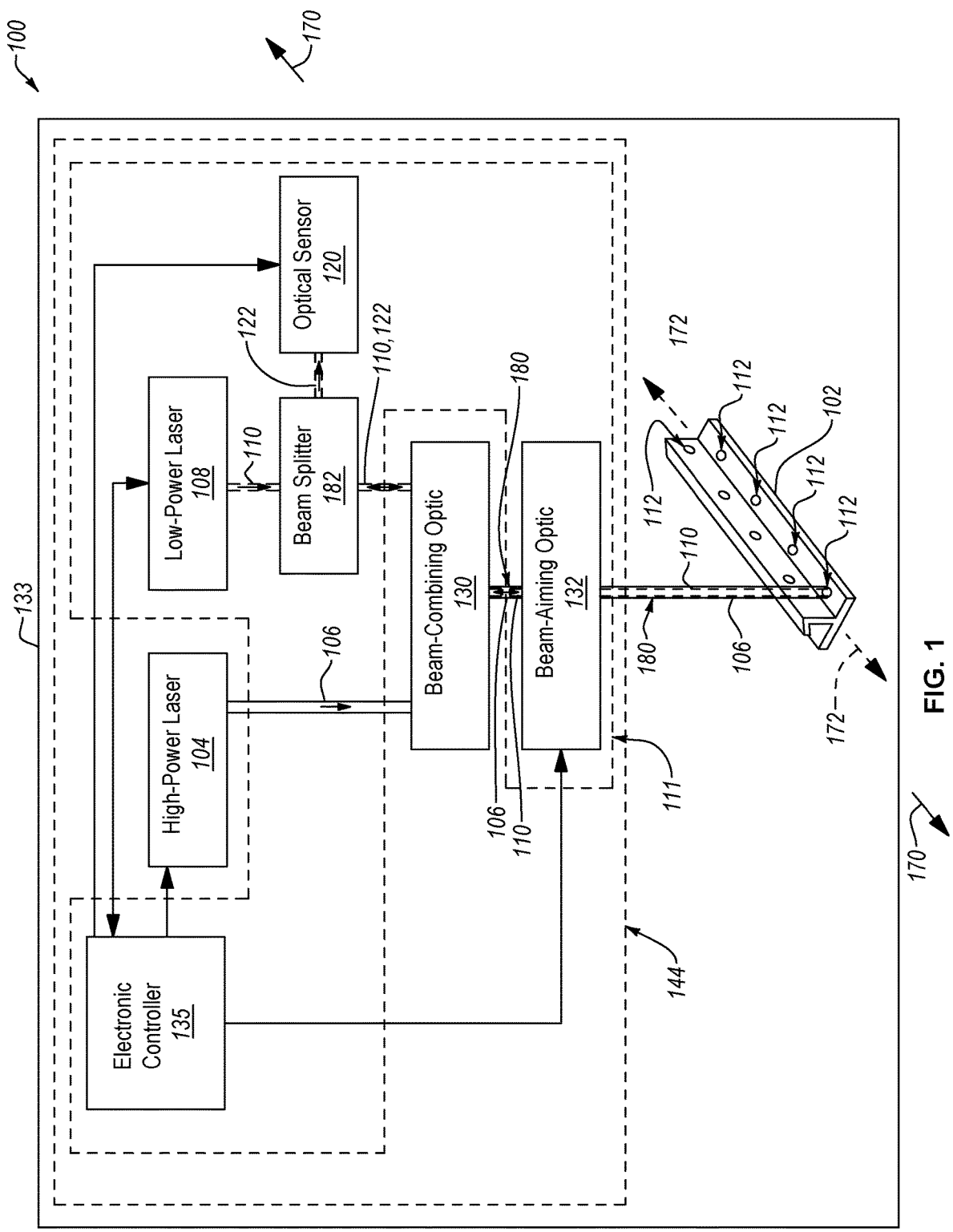
FIG. 1 is a schematic, block diagram of a system for laser bond inspection, according to one or more examples of the present disclosure.
Figure 5:
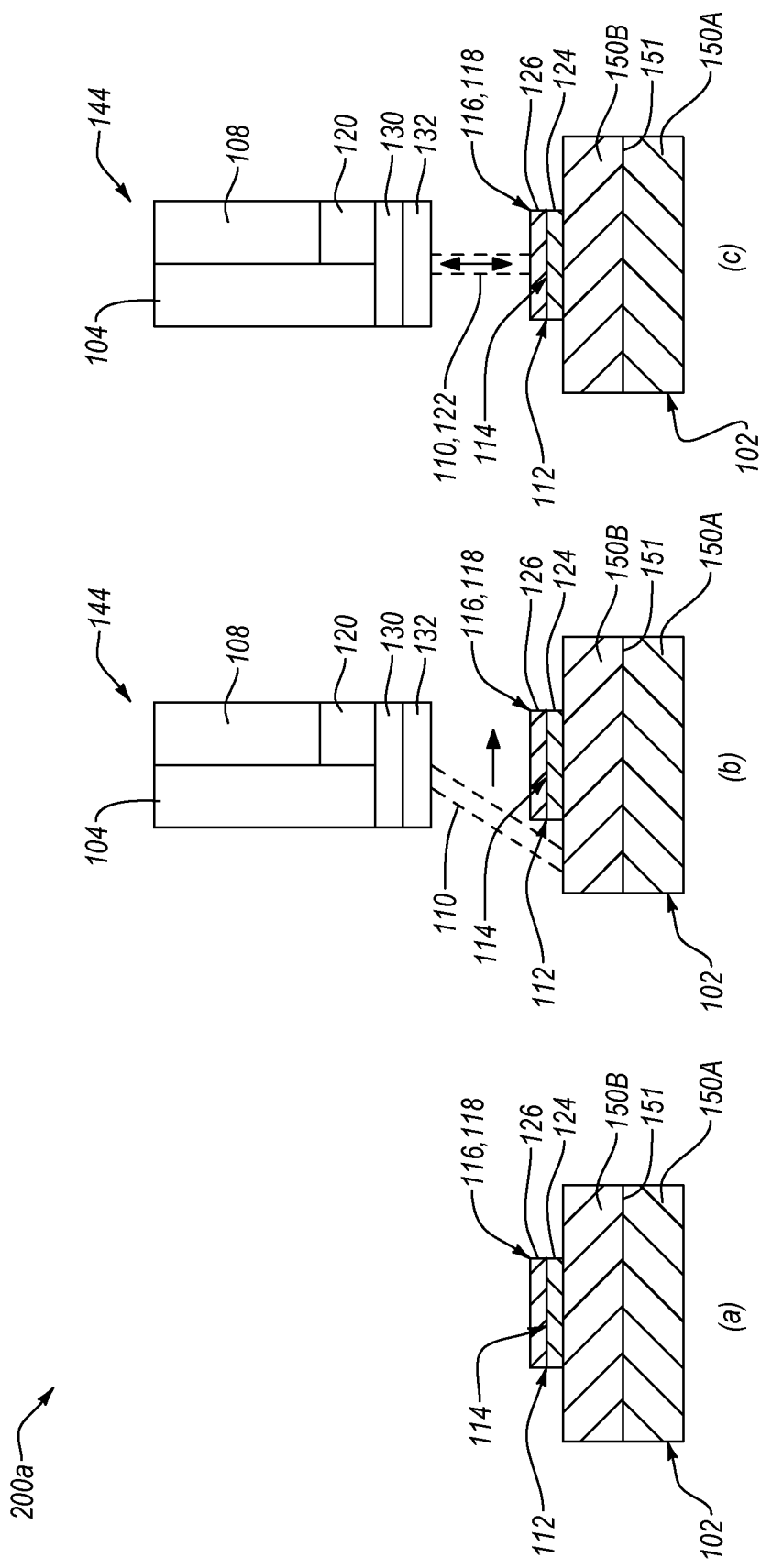
FIG. 5 is a schematic, flow diagram of a target locating process of a laser bond inspection method, according to one or more examples of the present disclosure.
Figure 6:
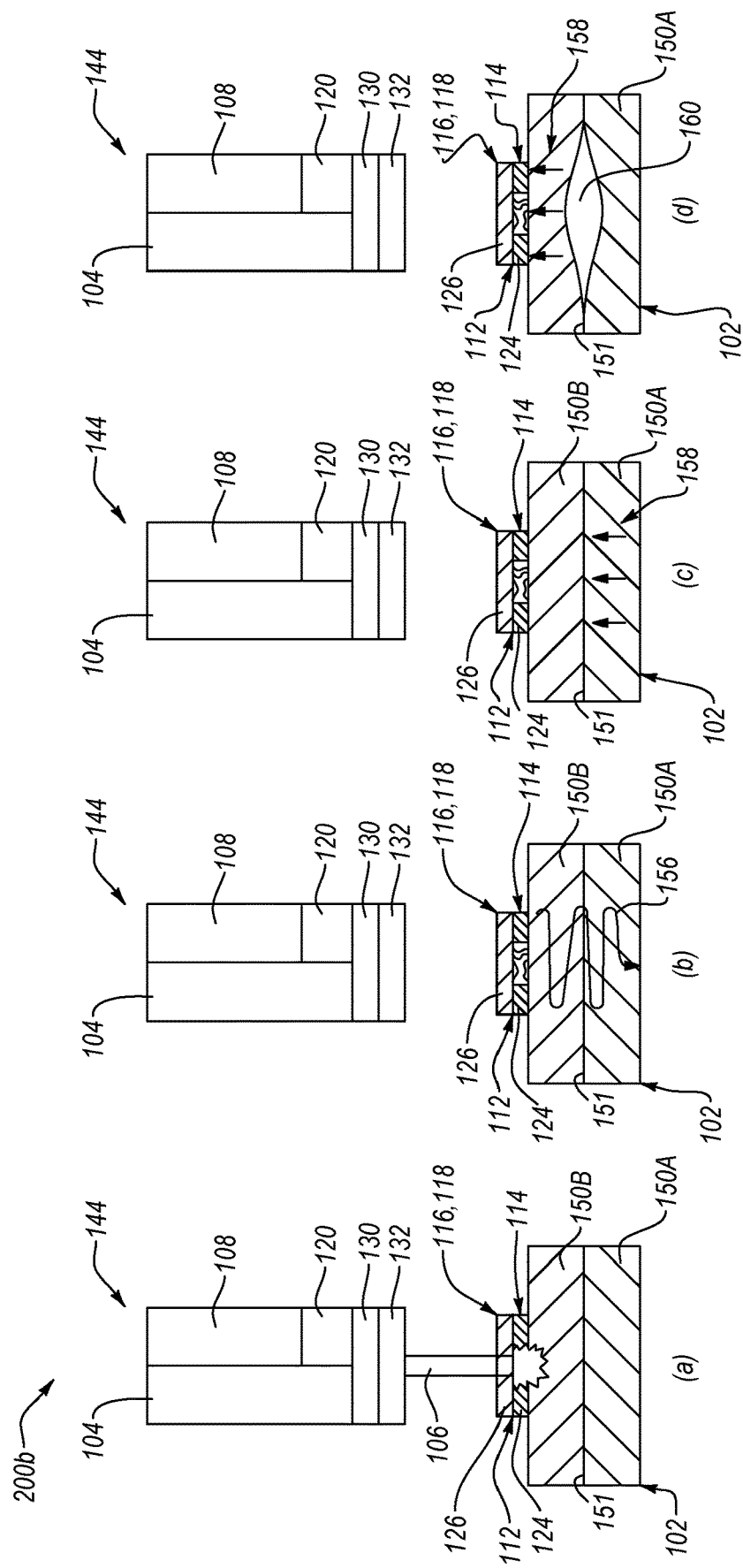
FIG. 6 is a schematic, flow diagram of a stress wave generating process of a laser bond inspection method, according to one or more examples of the present disclosure.

Referring to FIG. 1, according to some examples, disclosed herein is a laser bond inspection system 100 that inspects a part 102. As shown in FIGS. 5 and 6, the part 102 generally includes at least two layers, such as a first part layer 150A and a second part layer 150B, that are bonded together along a bondline, such as bondline 151, to form a laminated structure or part. The layers of the part 102 can be bonded together using any of various techniques, such as co-curing the layers together, adhesively bonding the layers together using an adhesive layer, or other bonding techniques. Moreover, the layers of the part 102 can be made from any of various materials, such as, for example, metals, fiber-reinforced polymeric materials, plastics, ceramics, and the like.

The laser bond inspection system 100 includes a high-power laser 104 and a low-power laser 108. The high-power laser 104 is operable to generate a high-power laser beam 106. In contrast, the low-power laser 108 is operable to generate a low-power laser beam 110. The high-power laser beam 106 and the low-power laser beam 110 are collimated and have a generally circular cross-sectional shape. The high-power laser 104 is configured to generate the high-power laser beam 106 as a series of high-power laser pulses each lasting a particular amount of time. The high-power laser beam 106 (e.g., each high-power laser pulse) has a high energy and the low-power laser beam 110 has a low energy. The high energy can be any of various energies sufficient to induce a disbond in a weak or defective bond of or an interlaminar delamination in a part 102, but insufficient to induce a disbond or interlaminar delamination in a strong or healthy bond or layer of the part 102. In certain examples, the high energy is approximately between 1 Joule (J) and 50 J. According to one example, the high energy is about 46 J for a 200 nanosecond pulse. The low energy of the low-power laser beam 110 is less than the high energy (e.g. a continuous power in the milliwatt range when operating). Moreover, the high-power laser beam 106 has a wavelength that is different than the wavelength of the low-power laser beam 110. In one example, the wavelength of the high-power laser beam 106 is within an infrared light spectrum, such as at least 700 nanometers (nm) (e.g., 1,053 nm). According to the same or another example, the wavelength of the low-power laser beam 110 is within a visible light spectrum, such as between 400 nm and 700 nm (e.g., 532 nm).

The system 100 additionally includes a beam-combining optic 130, such as a dichroic mirror, that is configured to combine the high-power laser beam 106 and the low-power laser beam 110 into a combined laser beam 180. Generally, the beam-combining optic 130 facilitates the beam path of the high-power laser beam 106 and the low-power laser beam 110 to be collinear (e.g., concentric) or have a common beam central axis. Accordingly, in some example, the beam-combining optic 130 receives the high-power laser beam 106 and the low-power laser beam 110 and directs the high-power laser beam 106 and the low-power laser beam 110 along a collinear beam path so that the high-power laser beam 106 is collinear with the low-power laser beam 110. Although the beam-combining optic 130 is capable of collinearly combining the high-power laser beam 106 and the low-power laser beam 110 into the combined laser beam 180, such a combination of laser beams occurs only when the high-power laser beam 106 and the low-power laser beam 110 are generated concurrently. When the high-power laser beam 106 and the low-power laser beam 110 are not generated concurrently, the high-power laser beam 106 and the low-power laser beam 110, while following collinear beam paths, are not combined into the combined laser beam 180. Accordingly, although illustrated in FIGS. 1 and 2 as a combined laser beam 180, it is recognized the high-power laser beam 106 and the low-power laser beam 110 need not be combined.

The system 100 also includes a beam-aiming optic 132, such as a mirror, that is positioned to receive both the high-power laser beam 106 and the low-power laser beam 110 from the beam-combining optic 130. The beam-aiming optic 132 is configured to redirect (e.g., aim) the high-power laser beam 106 and the low-power laser beam 110 relative to the part 102. Because the high-power laser beam 106 and the low-power laser beam 110 are collinear, the high-power laser beam 106 and the low-power laser beam 110, after being redirected by the beam-aiming optic 132, remain collinear and travel in a redirected beam. The redirected beam path is different than the beam path of the high-power laser beam 106 and the low-power laser beam 110 received from the beam-combining optic 130.

Figure 2:
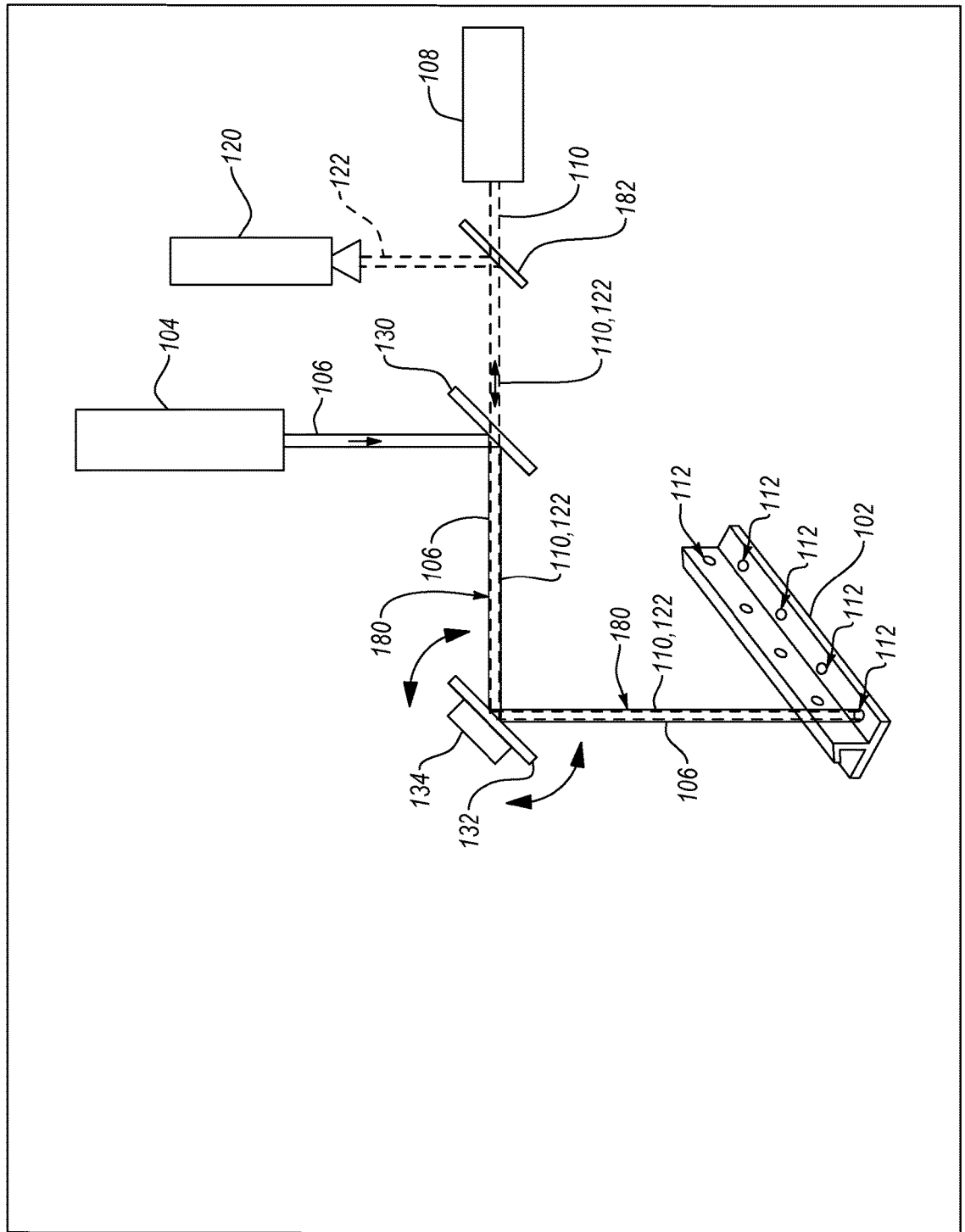
FIG. 2 is a schematic, block diagram of a system for laser bond inspection, according to one or more examples of the present disclosure.

According to certain examples, the beam-aiming optic 132 includes at least one beam-aiming mirror that is adjustable to rotate about one or more axis of rotation. In some examples, the beam-aiming optic 132 includes a plurality of beam-aiming mirrors where at least one beam-aiming mirror of the plurality of beam-aiming mirrors is adjustable to rotate about one or more axis of rotation. In certain examples, each one of a plurality of beam-aiming mirrors of the beam-aiming optic 132 is independently adjustable to rotate about one or more axis of rotation. Referring to FIG. 2, the beam-aiming optic 132, (e.g., a beam-aiming mirror) can be individually adjustable, as indicated schematically by rotational arrows, via operation of an actuator 134 operably coupled to the beam-aiming optic 132. In certain examples, the actuator 134 is a servo motor, piezo-electric steering system, galvanometer scanner, or other similar actuator.

In view of the foregoing, in some examples, the beam-aiming mirror of the beam-aiming optic 132 is any mirror suitable for efficiently reflecting light at both the wavelength of the high-power laser beam 106 and the low-power laser beam 110. Such suitable mirrors can include one or more bases and coatings, such as fused silica base and an optical coating. The coating is tuned (e.g., in thickness) to reflect light having the wavelength of both the high-power laser beam 106 and the low-power laser beam 110. In some examples, the beam-aiming mirror includes multiple coatings, such as one coating tuned to reflect light at the wavelength of the high-power laser beam 106 and another coating to reflect light at the wavelength of the low-power laser beam 110. It is also recognized that the laser bond inspection system 100 can include any of various other optics or mirrors, such as those tuned only to reflect one of the wavelengths of the high-power laser beam 106 or the low-power laser beam 110, in addition to the beam-combining optic 130 and the beam-aiming optic 132, to redirect the high-power laser beam 106 or the low-power laser beam 110 as desired, such as to comply with spatial constraints or avoid environmental obstacles.

In some examples, as shown in FIG. 2, the beam-combining optic 130 is located relative to the high-power laser 104 and the low-power laser 108 and configured to receive and reflect the high-power laser beam 106 along a beam path and to receive the low-power laser beam 110, traveling in the beam path, and allow the low-power laser beam 110 to pass through the beam-combining optic 130 along the same beam path. However, in other examples, the relative positions of the high-power laser 104 and the low-power laser 108 are reversed. For example, in certain instances, the beam-combining optic 130 is located relative to the high-power laser 104 and the low-power laser 108 and configured to receive and reflect the low-power laser beam 110 along a beam path and to receive the high-power laser beam 106, traveling in the beam path, and allow the high-power laser beam 106 to pass through the beam-combining optic 130 along the same beam path. In such an instance, the optical sensor 120, and the beam splitter 182 would also be relocated from what is shown in FIG. 2 so they maintained their relative positions to the low-power laser 108. The beam-combining optic 130 is fixed relative to high-power laser 104 and the low-power laser 108 in some examples.

Figure 3:
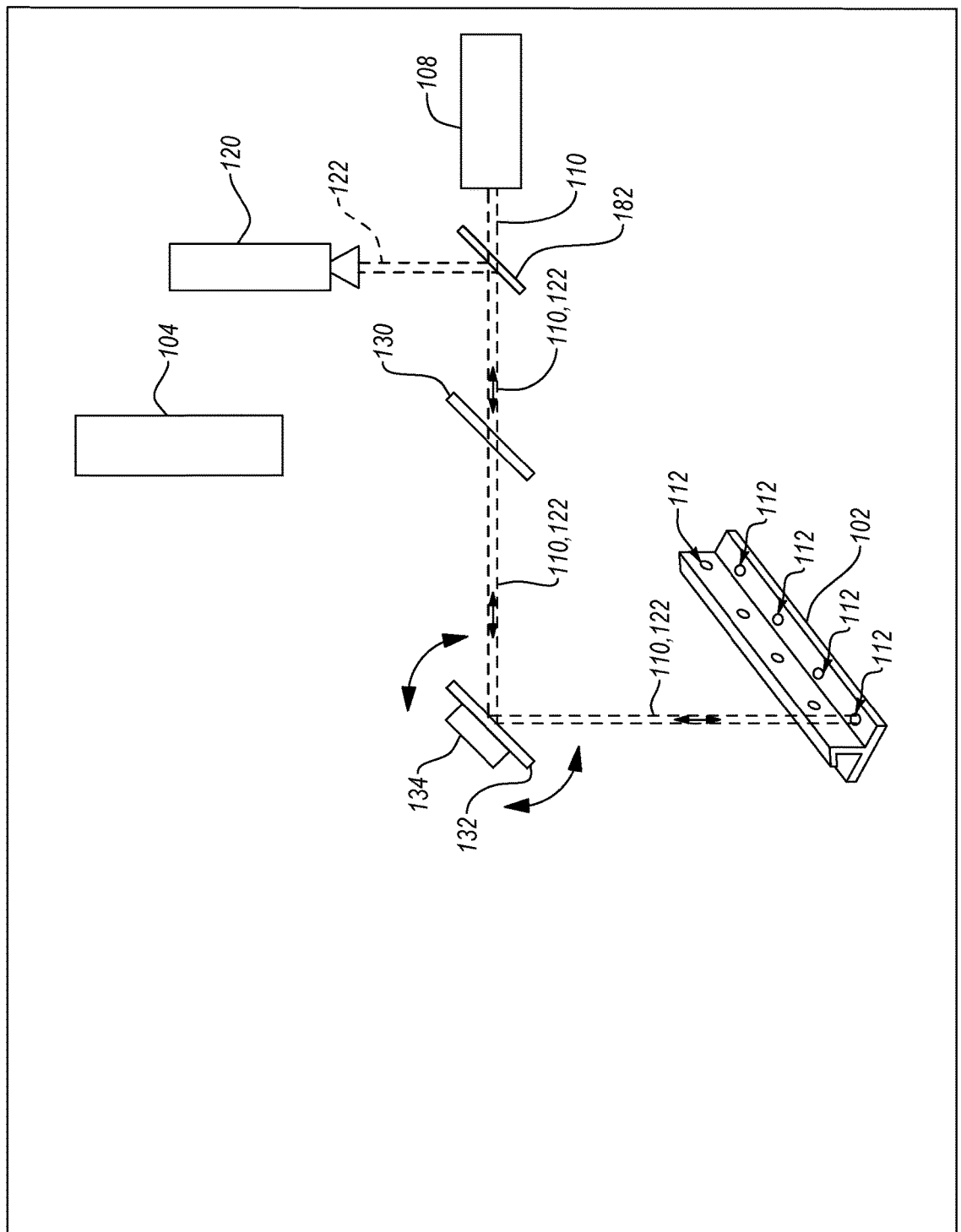
FIG. 3 is a schematic, block diagram of a system for laser bond inspection, according to one or more examples of the present disclosure.
Figure 4:
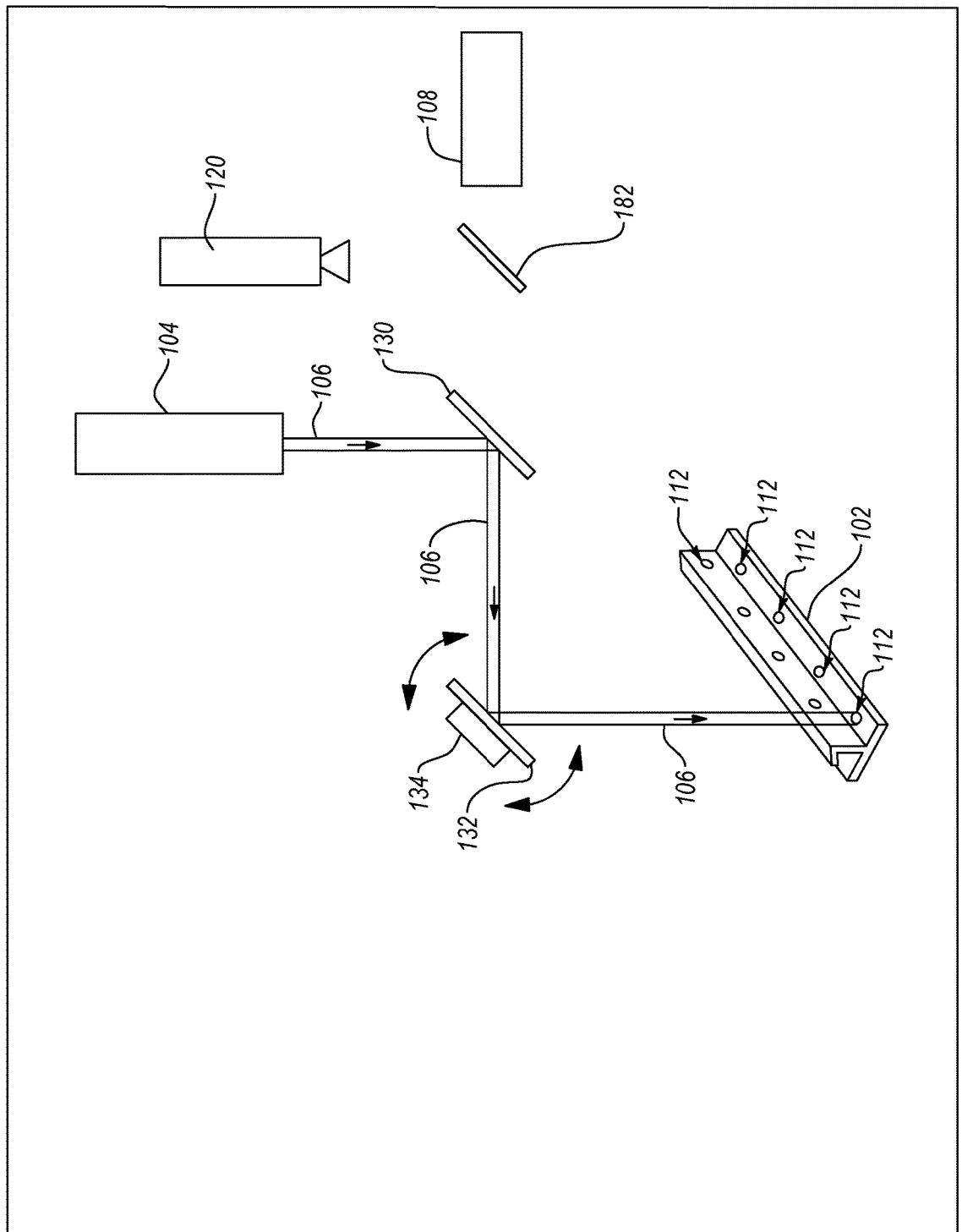
FIG. 4 is a schematic, block diagram of a system for laser bond inspection, according to one or more examples of the present disclosure.

In the example illustrated in FIG. 2, the high-power laser beam 106 and the low-power laser beam 110 are generated concurrently such that the beam-combining optic 130 collinearly combines the high-power laser beam 106 and the low-power laser beam 110 into the combined laser beam 180. However, to show an alternative example, in the example illustrated in FIGS. 3 and 4, the high-power laser beam 106 and the low-power laser beam 110 are not generated concurrently (e.g., sequentially or consecutively) such that the beam-combining optic 130 does not combine the high-power laser beam 106 and the low-power laser beam 110 into the combined laser beam 180. Instead, as shown in FIG. 3, the low-power laser beam 110 is generated before the high-power laser beam 106 such that only the low-power laser beam 110 is received by the beam-aiming optic 132 and redirected toward the part 102. Subsequently, after generation of the low-power laser beam 110 is stopped and as shown in FIG. 4, the high-power laser beam 106 is generated such that only the high-power laser beam 106 is received by the beam-aiming optic 132 and redirected toward the part 102. Again, whether the low-power laser beam 110 and the high-power laser beam 106 are generated concurrently or consecutively, the spatial parameters (e.g., angle, orientation, position, etc.) of the beam-aiming optic 132 are maintained for both the low-power laser beam 110 and the high-power laser beam 106, so the beam paths of the low-power laser beam 110 and the high-power laser beam 106 are collinear.

The laser bond inspection system 100 also includes an optical sensor 120 that is configured to detect a reflected portion 122 of the low-power laser beam 110. The reflected portion 122 is split from the low-power laser beam 110 by a beam splitter 182. Referring to FIG. 1, the optical sensor 120 and the beam splitter 182, together with the low-power laser 108 and the beam-aiming optic 132, form part of a target location system 111 of the laser bond inspection system 100. Although not shown, the target location system may include other components, such as an optical isolator, a laser beam dump, and/or other optics.

The optical sensor 120 can be any of various optical sensors calibrated to detect light having the energy and wavelength characteristics of the low-power laser beam 110. In some examples, the optical sensor 120 is one of a camera, photoconductive sensor, a photovoltaic sensor, a photodiode sensor, or a phototransistor sensor. Although one optical sensor 120 is shown, the target location system 111 can include multiple optical sensors 120 to promote an accurate and reliable detection of the reflected portion 122. The optical sensor(s) 120 are positioned in a location, relative to the part 102, the beam-aiming optic 132, and the beam-combining optic 130, to receive the reflected portion 122 when reflected off of a target patch 112 affixed to the part 102. The reflected portion 122 reflects off of the target patch 112 along the same beam path as (e.g., is collinear with) the low-power laser beam 110 before being reflected, so the beam splitter 182, which can be a partially-silvered mirror or other beam splitting optic, acts to redirect just the reflected portion 122 toward the optical sensor 120.

The laser bond inspection system 100 further includes an enclosure 133 that encloses the high-power laser beam 106 and the part 102 or the portion of the part 102 under inspection. The high-power laser beam 106 is dangerous to the human eye. Accordingly, the enclosure 133 is opaque to the high-power laser beam 106 and prevents the high-power laser beam 106 from exiting the enclosure 133. For example, the enclosure 133 can be made from metallic materials, drywall, semi-transparent plastic colored such that harmful proportions of infrared light are not allowed through, and the like. In other words, the enclosure 133 can be made from any material having a sufficiently high optical density at the wavelength of the high-power laser beam 106 to prevent injury to persons outside the enclosure 133. In some examples, the enclosure 133 is also opaque to the low-power laser beam 110. Depending on the size of the part 102, the enclosure 133 can be sized to enclose an entirety of the part 102 or just a portion of the part 102. In one example, for large parts 102, the enclosure 133 is configured to move along the part 102, as indicated by directional arrows 170, while the part 102 is held stationary. Alternatively, in another example, for large parts 102, the enclosure 133 is held stationary and the part 102 is moved through the enclosure, as indicated by dashed directional arrows 172 in FIG. 1.

As shown in FIG. 1, in some examples, the enclosure 133 is sized to additionally enclose the low-power laser beam 110, the optical sensor 120, and one or both of the beam-combining optic 130 and the beam-aiming optic 132. Additionally, according to one example, the high-power laser 104 and the low-power laser 108 are also enclosed within the enclosure 133. However, in another example, the high-power laser 104 and the low-power laser 108 are positioned external to the enclosure 133, but located relative to the enclosure 133 such that the high-power laser 104 and the low-power laser 108 emit the high-power laser beam 106 and the low-power laser beam 110, respectively, directly into the enclosure 133.

Referring to FIG. 1, in some examples, the high-power laser 104, the low-power laser 108, the beam-combining optic 130, the beam-aiming optic 132, the beam splitter 182, and the optical sensor 120 collectively define an inspection assembly 144 (e.g., probe). The inspection assembly 144 is positioned within and enclosed by the enclosure 133 in certain examples. The inspection assembly 144 can include more or less than the high-power laser 104, the low-power laser 108, the beam-combining optic 130, the beam-aiming optic 132, the beam splitter 182, and the optical sensor 120. For example, the inspection assembly 144 can also include an electronic controller 135.

According to one example, the inspection assembly 144 is fixed relative to the enclosure 133. As defined herein, the inspection assembly 144 can be considered fixed relative to the enclosure 133 when all the components of the inspection assembly 144 are collectively fixed relative to the enclosure 133, even if the individual components of the inspection assembly 144 can be individually and locally movable relative to the enclosure 133.

In other examples, the inspection assembly 144 is movable relative to the enclosure 133. According to one example, the components of the inspection assembly 144 are mounted to a platform (e.g., gantry) that is movably mounted directly or indirectly to the enclosure 133. In such an example, the platform can move relative to the part 102 along the enclosure 133 in one or more directions to accommodate the inspection of multiple locations along the part 102.

The laser bond inspection system 100 also includes a target patch 112 or a plurality of target patches 112. The target patch 112 or each one of the plurality of target patches 112 is configured to be affixed to the part 102 under inspection. The target patch 112 is affixed to the part 102 at a desired inspection site on the part 102. The target patch 112 is manually affixed to the part 102, in some examples, and automatically affixed to the part 102, in other examples. The target patch 112 is removably affixed to the part 102 in some examples such that, after inspection of the part 102 using the target patch 112, the target patch 112 can be removed from the part 102 without damaging the part 102.

Figure 7:
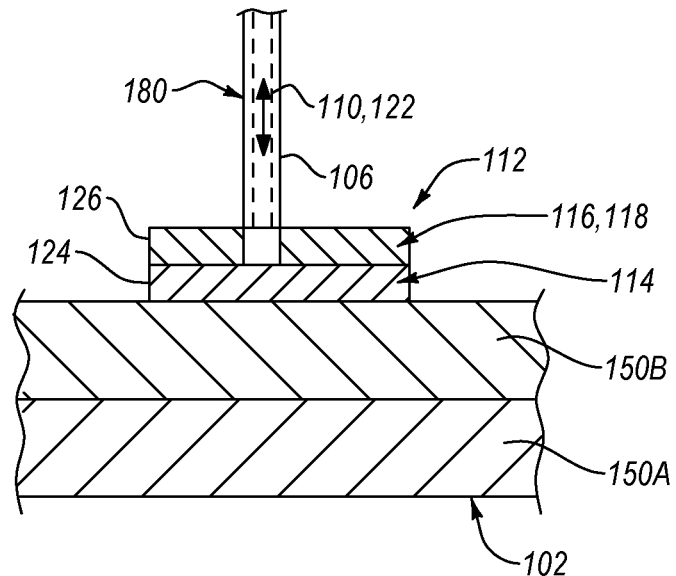
FIG. 7 is a schematic, side elevation view of a target patch, according to one or more examples of the present disclosure.

Referring to FIG. 7, the target patch 112, or each one of the plurality of target patches 112, includes an ablative portion 114, a tamping portion 116, and a retro-reflective portion 118. The ablative portion 114, the tamping portion 116, and the retro-reflective portion 118 are coupled together such that, in some examples, the target patch 112 is a self-contained modular unit. The ablative portion 114 is configured to absorb the high-power laser beam 106. Accordingly, the ablative portion 114 is made of a material that is opaque, but not substantially reflective, to the high-power laser beam 106, which causes the ablative portion 114 to absorb the high-power laser beam 106 when impacted by the high-power laser beam 106. A spot roughly the diameter of the high-power laser beam 106 is ablated from the ablative portion 114, but only a part of the thickness of the ablative layer 114 is ablated. In this way the surface of the part 102 is protected from damage that the high-power laser beam 106 might otherwise cause. The tamping portion 116 is configured to allow transmission of the high-power laser beam 106 therethrough and to redirect or block the mechanical energy (shockwave) generated by the partial ablation of the ablative portion 114, such that more mechanical energy is directed into the part 102 than would be the case without the inertial tamping portion 116. Accordingly, the tamping portion 116 is made of a material that is at least partially transparent to the high-power laser beam 106, but with properties (e.g., density) sufficient to deflect or contain energy generated in the ablative portion 114 from the high-power laser beam 106. Lastly, the retro-reflective portion 118 is configured to retro-reflect the low-power laser beam 110. Accordingly, the retro-reflective portion 118 is made from a material with properties sufficient to retro-reflect the low-power laser beam 110 when the low-power laser beam 110 impacts the material. In some examples, the material of the retro-reflective portion 118 is also configured to allow for transmission of the high-power laser beam 106 therethrough. Therefore, in some examples, the material of the retro-reflective portion 118 is retro-reflective of the low-power laser beam 110 and substantially transparent to the high-power laser beam 106.

The ablative portion 114, tamping portion 116, and retro-reflective portion 118 form at least part of one of at least two layers of the target patch 112. In other words, the target patch 112 has, at least, a first layer 124 and a second layer 126. Accordingly, the target patch 112 has a laminated or multi-layer construction. When affixed to an exterior surface of the part 102, the first layer 124 is directly adjacent (e.g., adjoins) the surface of the part 102 to which the target patch 112 is affixed. In some examples, an adhesive film is attached to the first layer 124 to promote adhesion of the first layer 124 to the surface of the part 102. As defined herein, when the target patch 112 includes an adhesive film, the first layer 124 is directly adjacent the surface of the part 102 when only the adhesive film is between the first layer 124 and the surface of the part 102. The second layer 126 is directly attached to the first layer 124, such as via an adhesive, bonding, or another attachment technique. Accordingly, when the target patch 112 is affixed to the part 102, such that the first layer 124 is directly adjacent the surface of the part 102, the first layer 124 is interposed between the second layer 126 and the surface of the part 102.

In some examples, as shown in FIG. 7, the first layer 124 of the target patch 112 includes the entirety of and only the ablative portion 114. According to certain examples, first layer 124 is a piece of tape, such as various colored vinyl tapes (e.g., black electrical tape), that is absorptive to the wavelength of high-power laser beam 106. The second layer 126 of the target patch 112 of FIG. 7 includes the entirety of the tamping portion 116 and the retro-reflective portion 118. In other words, the tamping portion 116 and the retro-reflective portion 118 of the target patch 112 are integrated or combined into a single layer. Accordingly, the second layer 126 is made of a material that is at least partially transparent to the high-power laser beam 106 and reflects the low-power laser beam 110. In certain examples, the second layer 126 is a piece of wavelength-selective, retro-reflective tape that is retro-reflective at wavelengths of the low-power laser beam 110, but not retro-reflective at wavelengths of the high-power laser beam 106. The wavelength-selective, retro-reflective tape can be, but is not limited to, any tapes that can be tuned to not reflect and allow the through-transmission of light in wavelengths of the high-power laser beam 106, but reflect light in wavelengths of the low-power laser beam 110.

Figure 12:
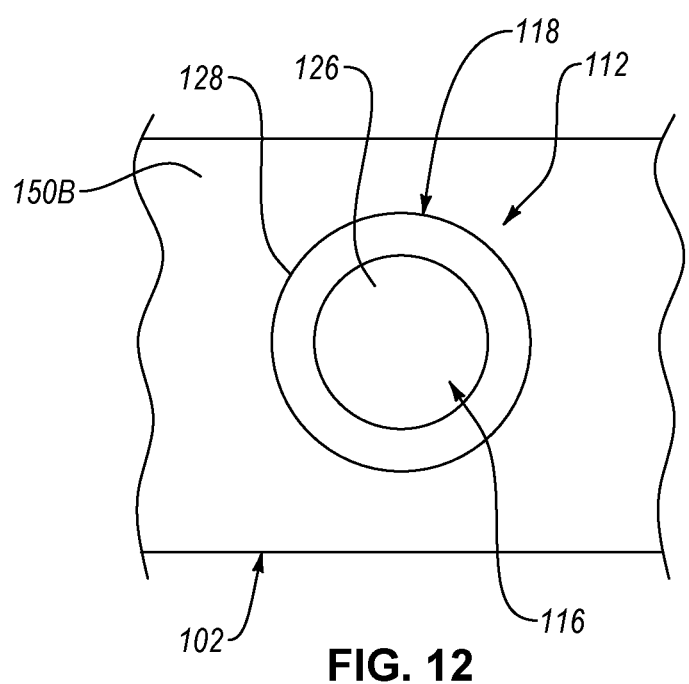
FIG. 12 is a schematic, top plan view of the target patch of FIG. 11, according to one or more examples of the present disclosure.
Figure 13:
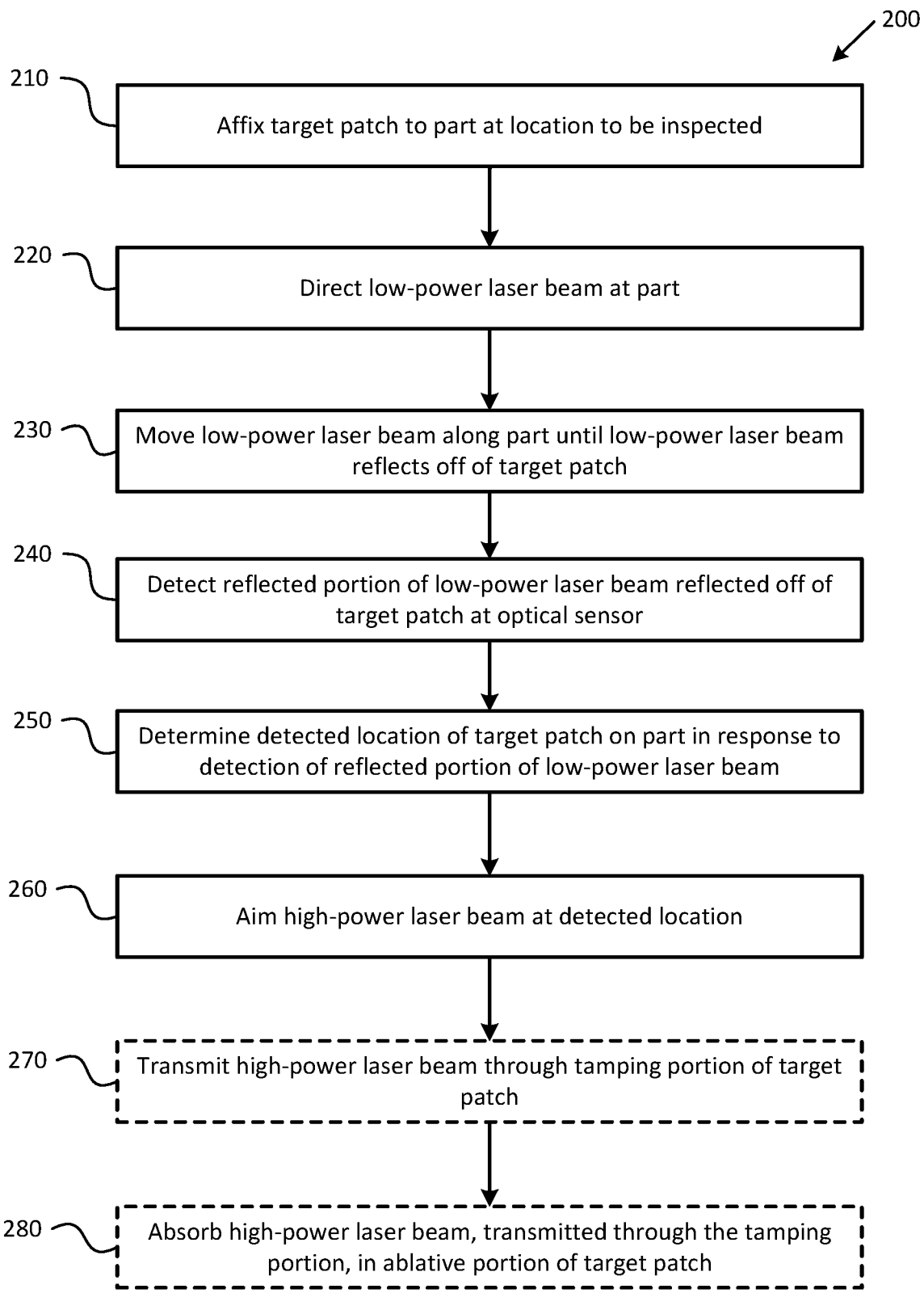
FIG. 13 is a schematic, flow chart of a method of laser bond inspecting a part, according to one or more examples of the present disclosure.

Referring to FIG. 13, according to some examples, a method 200 of laser bond inspecting the part 102 is disclosed herein. The method 200 includes a target locating process 200a, as illustrated in flow diagram format in FIG. 5, and a stress wave generating process 200b, as illustrated in flow diagram format in FIG. 6. Referring to step (a) of FIG. 5 and FIG. 13, the target locating process 200a of the method 200 includes (block 210) affixing the target patch 112 or a plurality of target patches 112 to the part 102 at a location (e.g., testing site) or locations (e.g., testing sites) to be inspected. As presented above, affixing the target patch 112 can be performed manually or in an automated manner, such as with a robotic arm or other automated applicator. The location(s) at which the target patch(es) 112 are affixed is predetermined in some examples. For instance, utilizing the computer-aided design (CAD) model of the part 102, the testing sites can be preselected and digitally saved. Accordingly, in some examples, the digitally saved testing sites are used by an automated applicator to affix the target patches 112 at the testing sites stored with the CAD model. The digitally saved testing sites can be used later in the target locating process 200a to help locate the target patches 112 on the part 102. For illustrative purposes, the target patch 112 in FIGS. 5 and 6 shares the same configuration as described above in association with FIG. 7. However, the method 200 is applicable to any of the various configurations of target patches 112 described herein, such as those in association with FIGS. 8-12.

Referring to step (b) of FIG. 5, the target locating process 200a of the method 200 further includes (block 220) directing the low-power laser beam 110 at the part 102 and (block 230) moving the low-power laser beam 110 along the part 102 until the low-power laser beam 110 reflects off of the target patch 112. The low-power laser beam 110 reflects off of the retro-reflective portion 118 of the target patch 112, which in the illustrated example of FIGS. 5-7, is incorporated into the second layer 126 of the target patch 112. The low-power laser beam 110 is directed at the part 102 and moved relative to the part 102 by adjusting the beam-aiming optic 132, which can be controlled by the electronic controller 135. For example, a beam-aiming mirror of the beam-aiming optic 132 can be adjusted to move the low-power laser beam 110 along the part 102. The low-power laser beam 110 can be moved according to a predetermined pattern, such as a rastering pattern. In some examples, the low-power laser beam 110 is moved according to a digitally saved testing site associated with a CAD model of the part 102. For example, the electronic controller 135 can control the beam-aiming optic 132 to aim the low-power laser beam 110 at a location on the part 102 associated with a digitally saved testing site (e.g., a location on the part 102 where a target patch 112 should be). In the above examples, the electronic controller 135 forms part of the target location system 111.

Referring to step (c) of FIG. 5, the target locating process 200a of the method 200 additionally includes (block 240) detecting, at the optical sensor 120, the reflected portion 122 of the low-power laser beam 110 that is retro-reflected off of the target patch 112. In other words, the low-power laser beam 110 is moved along the part 102 by adjusting the beam-aiming optic 132 until the reflected portion 122 of the low-power laser beam 110 is detected by the optical sensor 120. The configuration (e.g., spatial parameters) of the beam-aiming optic 132 when the reflected portion 122 can then be logged if desired. The retro-reflective portion 118 of the target patch 112 is configured to reflect the reflected portion 122 along the same beam path as the low-power laser beam 110 when received at the surface of the part 102. In other words, the reflected portion 122 and the low-power laser beam 110 follow the same or a collinear path, except the low-power laser beam 110 is transmitted towards the part 102 and the reflected portion 122 transmits away from the part 102, as indicated by dual directional lines in FIGS. 1-3. The reflected portion 122 is ultimately split from the low-power laser beam 110 by the beam splitter 182 and received at the optical sensor 120.

The target locating process 200a then optionally includes (block 250) determining a detected location of the target patch 112 on the part 102 in response to detection of the reflected portion 122 of the low-power laser beam 110. The detected location of the target patch 112 is determined by the electronic controller 135 which receives the signals from the optical sensor 120 and the beam aiming angle(s) of the actuator 134. The electronic controller 135 may determine the location of the target patch 112 using techniques such as triangulation, time-of-flight measurements, a digital knowledge of the geometry of the part 102, and other methods. The detected location of the target patch 112 can be used to log the results of the stress wave generating process 200b and subsequent defect detection process at that location.

In some examples, the low-power laser beam 110 is moved along the target patch 112 until the low-power laser beam 110 reflects off of all portions of the target patch 112 and the low-power laser beam 110 scans around the target patch 112. This helps to identify the entire target patch 112, and its location, and allows the high-power laser beam 106 to be accurately aimed and impact the target patch 112 at a desired location (e.g., center) of the target patch 112.

Now referring to step (a) of FIG. 6, the stress wave generating process 200b of the method 200 includes (block 260) aiming the high-power laser beam 106 at the detected location. In the illustrated examples, aiming the high-power laser beam 106 at the detected location includes generating the high-power laser beam 106 such that the high-power laser beam 106 follows a path that is collinear with the low-power laser beam 110 when the reflected portion 122 is detected. In other words, aiming the high-power laser beam 106 at the detected location includes generating the high-power laser beam 106 such that the high-power laser beam 106 reflects off of the beam-aiming optic 132 with the beam-aiming optic 132 having the same configuration (e.g., a final spatial parameter value) as the beam-aiming optic 132 when the reflected portion 122 is detected. In some examples, this simply means the configuration of the beam-aiming optic 132, when the reflected portion 122 is detected, which is defined as the final spatial parameter value of the beam-aiming optic 132, is maintained as the high-power laser beam 106 is generated. Accordingly, by detecting the target patch 112 with the low-power laser beam 110, utilizing the beam-aiming optic 132, no further determinations, calculations, or adjustments are needed to ensure the high-power laser beam 106 is aimed and directed to the target patch 112, which promotes efficiency and accuracy.

However, as disclosed above, in some examples, aiming the high-power laser beam 106 at the detected location at block 260 can include adjusting the beam-aiming optic 132 to aim the high-power laser beam 106 at a center of the target patch 112 after the low-power laser beam 110 has scanned, detected, and located a center of the target patch 112. Accordingly, in such examples, a center of the target patch 112 is the detected location of the target patch 112 and is determined by scanning the low-power laser beam 110 on and around the target patch 112, thus detecting, at the optical sensor 120, reflected portions 122 of the low-power laser beam at multiple locations on the target patch 112. Then, based on the determined center of the target patch 112, the beam-aiming optic 132 is adjusted to aim the high-power laser beam 106 at the center of the target patch 112.

By aiming the high-power laser beam 106 at the detected location, the high-power laser beam 106 impacts the target patch 112. Although directing the low-power laser beam 110 and the high-power laser beam 106 at the target patch 112 at an angle normal to the surface of the target patch 112 and the part 102 occurs in some examples, in other examples, the angle need not be normal. For example, the angle can be up to 20-degrees off of normal in some examples.

In some examples, an intensity (e.g., energy level) of the high-power laser beam 106 is adjusted, such as by the electronic controller 135, before being aimed at the detected location in response to the distance of the detected location of the target patch 112 relative to the beam-aiming optic 130 and/or the optical sensor 120. The difference in location of multiple spaced-apart target patches 112 can change the distance from the target patches 112 to the beam-aiming optic 130, which can affect a difference in energy losses experienced by the high-power laser beam 106 as it travels different distances through air. Accordingly, such an adjustment to the intensity of the high-power laser beam 106 (e.g., adjusted higher for longer distances or lower for shorter distances) can be useful to maintain a constant intensity of the high-power laser beam 106 when multiple target patches 112 are used to inspect the part 102.

As shown in step (a) of FIG. 6, aiming the high-power laser beam 106 at the detected location results in the high-power laser beam 106 impacting the target patch 112. Accordingly, in some examples, the stress wave generating process 200b of the method 200 further includes (block 270) transmitting the high-power laser beam 106 through the tamping portion 116 of the target patch 112. In the illustrated examples of FIGS. 5-7, the tamping portion 116, along with the retro-reflective portion 118, is incorporated into the second layer 126 of the target patch 112. However, recall that the retro-reflective properties of the second layer 126 in these examples are chosen such that the second layer 126 is retro-reflective to the low-power laser beam 110, but not the high-power laser beam 106. Therefore, the high-power laser beam 106 does not reflect off of the second layer 126, but transmits through the second layer 126.

After the high-power laser beam 106 is transmitted through the tamping portion 116, the stress wave generating process 200b of the method 200 additionally includes (block 280) absorbing the high-power laser beam 106 in the ablative portion 114 of the target patch 112. In the illustrated examples of FIGS. 5-7, only the ablative portion 114 is incorporated into the first layer 124 of the target patch 112. As previously described, part of the thickness of the ablative portion 114, or the first layer 124, of the target patch 112 is ablated (undergoes ablation 154), generating a shockwave. The portion of the shockwave created by the ablation 154, in a direction away from the part 102, is constrained by the tamping portion 116, or the second layer 126 in FIGS. 5-7. Constraining the portion of the shockwave which would have gone away from the part 102 results in a higher shockwave energy going towards the part 102, which makes more efficient use of the energy delivered by the high-power laser beam 106.

Because the first layer 124 or the ablative portion 114 is directly adjacent the part 102, the shockwave caused by the ablation 154 in the ablative portion 114 is transferred directly into the surface of the part 102. The impact of the shockwave on the surface of the part 102 induces a compression stress wave 156 that propagates through the structure as shown in step (b) of FIG. 6. The compression stress wave 156 propagates from a front surface of the part 102 (e.g., the surface impacted by the shockwave) to a back surface of the part 102 that opposes the front surface. As shown in step (c) of FIG. 6, upon reaching the back surface of the part 102, the compression stress wave 156 reflects off of the back surface as a tension stress wave 158. In other words, reflection off the back surface of the part 102 converts the compression stress wave 156 into a tension stress wave 158. The frequency and magnitude of the compression stress wave 156 and the tension stress wave 158 are based on the pulse duration and irradiance of the energy impacting the surface of the structure 102, which can be controlled by the electronic controller 135 via operably controlling the high-power laser 104.

Referring to step (d) of FIG. 6, the tension stress wave 158 propagates from the back surface to the front surface of the part 102. As the tension stress wave 158 passes through the bondline 151, the tension stress wave 158 applies a proof test load to the bond between the first part layer 150A and the second part layer 150B. The load includes opposing tension forces that urge the first part layer 150A and the second part layer 150B away from each other along the bondline 151, which is defined as the interface between the first part layer 150A and the second part layer 150B. At locations along the bondline 151 where the bond is strong, the strength of the bond resists separation of the first part layer 150A and the second part layer 150B urged by the opposing tension forces of the tension stress wave 158. However, at locations along the bondline 151 where the bond is weak, the strength of the bond is unable to resist separation of the first part layer 150A and the second part layer 150B, and the first part layer 150A and the second part layer 150B separate along the bondline 151 to form a pocket or disbond 160 between the layers. Generally, the disbond 160 is a localized area of the bond where the first part layer 150A and the second part layer 150B have separated Accordingly, the disbond 160 can be defined as a localized delamination of bonded surfaces.

Although delamination along the bondline 151 is typically the most common type of delamination, other types of delamination may occur. For example, voids or pockets may form within one or more of the first part layer 150A or the second part layer 150B. Such voids or pockets internal to the first part layer 150A or the second part layer 150B are defined as interlaminar delamination.

After the high-power laser beam 106 is absorbed in the ablative portion 114 of the target patch 112 and the compression stress wave 156 and the tension stress wave 158 has propagated through the part 102, the part 102 can undergo a conventional ultrasound evaluation process, or other similar non-destructive evaluation technique, to detect the presence or absence of delamination in the part 102. One conventional ultrasound evaluation process includes transmitting high-frequency acoustic waves into the part 102. The acoustic waves reflect off features within the structure as reflected acoustic waves. Detection of reflected acoustic waves determines the presence of delaminations (e.g., disbonds) in the part 102 if any were induced during testing. The presence of delaminations indicates a defective part and the absence of delaminations indicates a healthy part.

Figure 8:
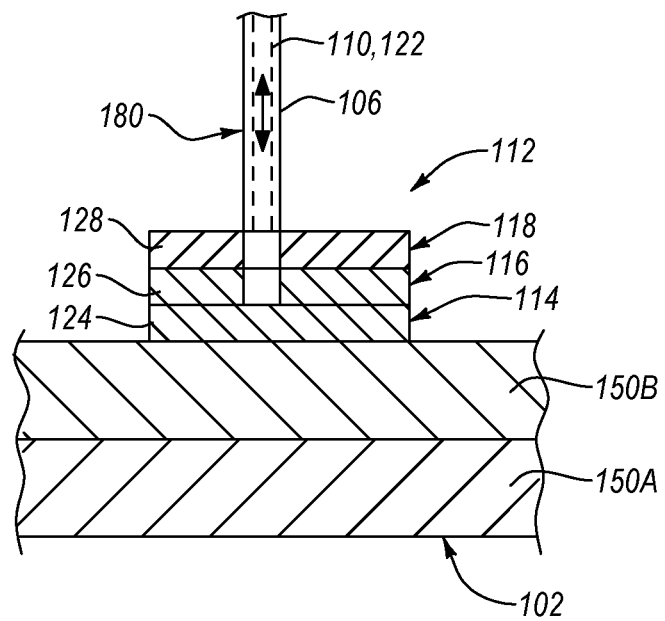
FIG. 8 is a schematic, side elevation view of a target patch, according to one or more examples of the present disclosure.

The method 200 has been described in association with examples of the target patch 112 shown in FIGS. 5-7. However, other examples of the target patch 112 are usable in the method 200 of laser bond inspecting the part 102. For example, referring to FIG. 8, according to one example, in addition to the first layer 124 and the second layer 126, the target patch 112 also includes a third layer 128. The ablative portion 114 of the target patch 112 is defined (e.g., entirely defined) by the first layer 124, the tamping portion 116 is defined (e.g., entirely defined) by the second layer 126, and the retro-reflective portion 118 is defined (e.g., entirely defined) by the third layer 128. The first layer 124, the second layer 126, and the third layer 128 are stacked together to form a multi-layered or laminated construction. When affixed to the part 102, as shown in FIG. 8, the first layer 124 is directly adjacent the part 102, the first layer 124 is interposed between the part 102 and the second layer 126, and the second layer 126 is interposed between the first layer 124 and the third layer 128. As shown, in this configuration, the low-power laser beam 110, when aimed at the target patch 112 of FIG. 8, reflects off of the third layer 128 and the high-power laser beam 106, when aimed at the target patch 112, transmits through the third layer 128 and the second layer 126 before being absorbed by the first layer 124.

Figure 9:
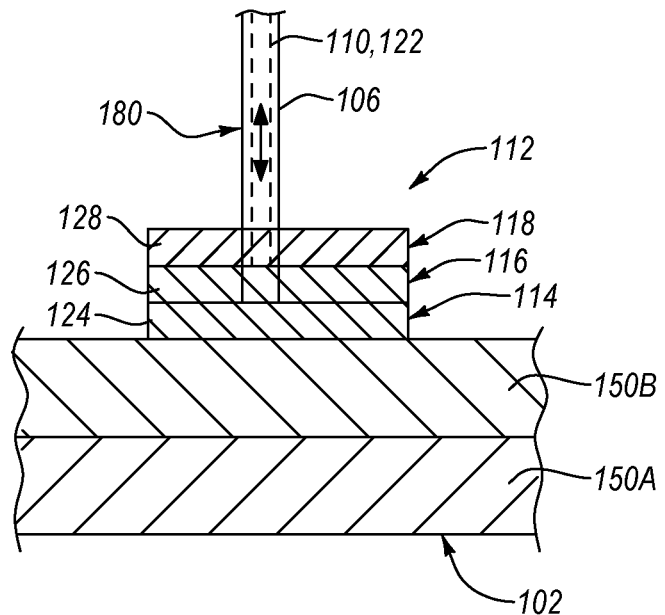
FIG. 9 is a schematic, side elevation view of a target patch, according to one or more examples of the present disclosure.

Similar to the target patch 112 shown in FIG. 8, the example of the target patch 112 shown in FIG. 9 also includes three layers where the first layer 124 defines or entirely defines the ablative portion 114 of the target patch 112. However, unlike the target patch 112 of FIG. 8, the second layer 126 of the the target patch 112 of FIG. 9 defines or entirely defines the retro-reflective portion 118 of the target patch 112 and the third layer 128 of the target patch 112 of FIG. 9 defines or entirely defines the tamping portion 116 of the target patch 112. Accordingly, the retro-reflective portion 118 is interposed between the tamping portion 116 and the ablative portion 114. As shown, when affixed to the part 102, the low-power laser beam 110, when aimed at the target patch 112 of FIG. 9, transmits through the third layer 128 and reflects off of the second layer 126 and the high-power laser beam 106, when aimed at the target patch 112, transmits through the third layer 128 and the second layer 126 before being absorbed by the first layer 124.

Although not shown, in some examples of the target patch 112 having three layers, the first layer 124 defines or entirely defines the retro-reflective portion 118, the second layer 126 defines or entirely defines the ablative portion 114, and the third layer 128 defines or entirely defines the tamping portion 116. Such a configuration, although less efficient in terms of transferring energy from the high-power laser beam 106 into the part 102, may still be desirable from a cost perspective or when the adhesion properties of the layers dictate as much.

Figure 10:
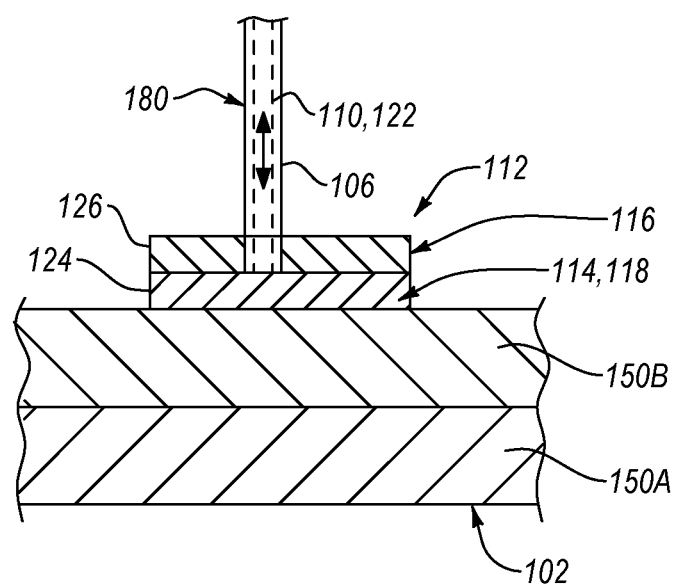
FIG. 10 is a schematic, side elevation view of a target patch, according to one or more examples of the present disclosure.

Referring to FIG. 10, according to another example, the target patch 112 includes only two layers where the first layer 124 includes both the ablative portion 114 and the retro-reflective portion 118 and the second layer 126 includes the tamping portion 116. Accordingly, the first layer 124 can be a strip of material (e.g., retro-reflective tape) that is capable of reflecting the low-power laser beam 110 and absorbing the high-power laser beam 106. As shown, when affixed to the part 102, the low-power laser beam 110, when aimed at the target patch 112 of FIG. 10, transmits through the second layer 126 and reflects off of the first layer 126 and the high-power laser beam 106, when aimed at the target patch 112, transmits through the second layer 126 before being absorbed by the first layer 124.

Figure 11:
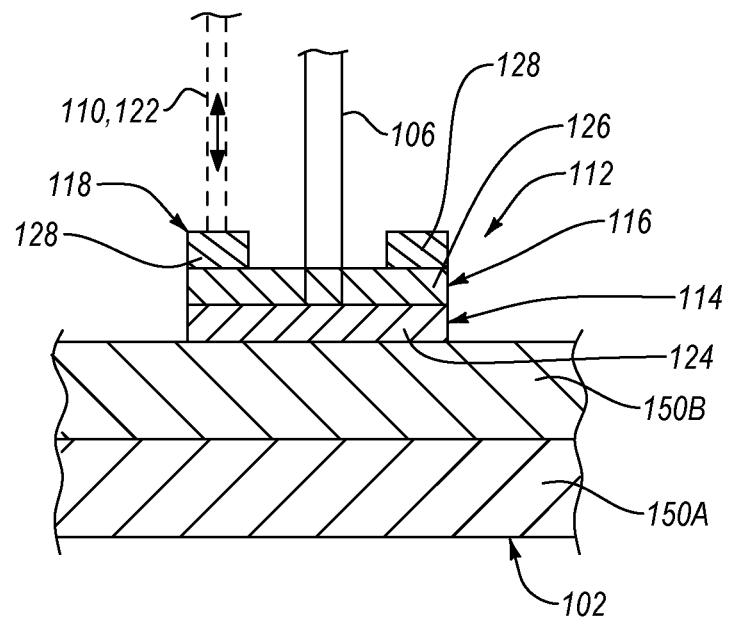
FIG. 11 is a schematic, side elevation view of a target patch, according to one or more examples of the present disclosure.

Referring now to FIGS. 11 and 12, according to yet another example, the target patch 112 includes three layers. However, not all of the three layers are in a stacked configuration like the target patch 112 of FIGS. 8 and 9. More specifically, the first layer 124 and the second layer 126 are stacked such that the first layer 124 is interposed between the part 102 and the second layer 126 when the target patch 112 is affixed to the part 102. The third layer 128 is stacked on the second layer 126. However, the third layer 128 has a ring-like shape that extends atop and along an outer periphery of the second layer 126. The first layer 124 includes the ablative portion 114, the second layer 126 includes the tamping portion 116, and the third layer 128 includes the retro-reflective portion 118. Accordingly, the retro-reflective portion 118 only partially covers the ablative portion 114 and the tamping portion 116. As shown, when affixed to the part 102, the low-power laser beam 110, when aimed at the target patch 112 of FIGS. 11 and 12, reflects off of the third layer 128. The high-power laser beam 106 can then be aimed at the target patch 112, such as by adjusting the beam-aiming optic 132 so that the high-power laser beam 106 contacts the first layer 124 and the second layer 126 of the target patch 112, rather than the third layer 126, and transmits through the second layer 126 before being absorbed by the first layer 124. Although not shown, in some examples, the third layer 128 is not stacked on the second layer 126. Rather, the third layer 128, with its ring-like shape, surrounds the first layer 124 and the second layer 126. In such examples, the retro-reflective portion 118 does not cover the ablative portion 114 and the tamping portion 116.

In certain examples, the target location system 111 scans the low-power laser beam 110 around the third layer 128, by reflecting off of different portions of the third layer 128, to determine the location and center of the ring. Then based on the location and/or center of the ring formed by the third layer 128, the target location system 111 aims the high-power laser beam 106, using the beam-aiming optic 132, at the center of the ring, which is the center of the first layer 124 and the second layer 126.

Although the target patch 112 of the illustrated examples has a generally circular outer peripheral shape, in other examples, the outer peripheral shape of the target patch 112 can be any of various other symmetrical shapes, such as rectangular, square, triangular, ovular, polygonal, or non-symmetrical shapes.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A laser bond inspection system for inspecting a part, the laser bond inspection system comprising:
   a high-power laser, configured to generate a high-power laser beam having a high energy;
   a low-power laser, configured to generate a low-power laser beam having a low energy that is less than the high energy;
   a target patch, configured to be affixed to the part;
   a beam-aiming optic, configured to receive the low-power laser beam from the low-power laser and redirect the low-power laser beam at the target patch when the target patch is affixed to the part; and
   an optical sensor, configured to detect a reflected portion of the low-power laser beam reflected off of the target patch;
   wherein the beam-aiming optic is further configured to receive the high-power laser beam from the high-power laser and redirect the high-power laser beam at the target patch.

2. The laser bond inspection system according to claim 1, wherein the target patch comprises:
   an ablative portion, configured to absorb the high-power laser beam;
   a tamping portion, configured to allow transmission of the high-power laser beam through the tamping portion and to redirect energy absorbed by the ablative portion into the part when the target patch is affixed to the part; and
   a retro-reflective portion, configured to reflect the low-power laser beam.

3. The laser bond inspection system according to claim 2, wherein the target patch comprises:
   a first layer, directly adjacent the part when the target patch is affixed to the part, wherein the first layer comprises the ablative portion; and
   a second layer, affixed to the first layer, wherein the second layer comprises the tamping portion and the retro-reflective portion.

4. The laser bond inspection system according to claim 3, wherein the second layer comprises retro-reflective tape configured to reflect the low-power laser beam and allow transmission of the high-power laser beam through the retro-reflective tape.

5. The laser bond inspection system according to claim 2, wherein the target patch comprises:
   a first layer, directly adjacent the part when the target patch is affixed to the part, wherein the first layer comprises the ablative portion and the retro-reflective portion; and
   a second layer, affixed to the first layer, wherein the second layer comprises the tamping portion.

6. The laser bond inspection system according to claim 2, wherein the target patch comprises:
   a first layer, directly adjacent the part when the target patch is affixed to the part, wherein the first layer comprises the ablative portion;
   a second layer, affixed to the first layer, wherein the second layer comprises the retro-reflective portion; and
   a third layer, affixed to the second layer, wherein the third layer comprises the tamping portion.

7. The laser bond inspection system according to claim 2, wherein the target patch comprises:
   a first layer, directly adjacent the part when the target patch is affixed to the part, wherein the first layer comprises the ablative portion;
   a second layer, affixed to the first layer, wherein the second layer comprises the tamping portion; and
   a third layer, affixed to the second layer, wherein the third layer comprises the retro-reflective portion.

8. The laser bond inspection system according to claim 2, wherein the retro-reflective portion has a ring-like shape.

9. The laser bond inspection system according to claim 1, wherein the beam-aiming optic comprises an adjustable mirror.

10. The laser bond inspection system according to claim 9, further comprising a beam-combining optic located relative to the high-power laser beam and the low-power laser beam such that the high-power laser beam is reflected off of the beam-combining optic along a beam path toward the beam-aiming optic and that the low-power laser beam passes through the beam-combining optic along the beam path.

11. The laser bond inspection system according to claim 9, wherein spatial parameters of the beam-aiming optic, relative to the part, when redirecting the low-power laser beam at the target patch and redirecting the high-power laser beam at the target patch, are the same.

12. The laser bond inspection system according to claim 1, further comprising an enclosure that encloses the high-power laser beam when generated by the high-power laser, the low-power laser beam when generated by the low-power laser, the target patch when affixed to the part, the beam-aiming optic, and the optical sensor, wherein the enclosure is opaque to the high-power laser beam.

13. The laser bond inspection system according to claim 1, wherein:
   the high-power laser beam has a wavelength within the infrared light spectrum; and
   the low-power laser beam has a wavelength within the visible light spectrum.

14. A laser bond inspection system for inspecting a part, the laser bond inspection system comprising:
   a high-power laser, configured to generate a high-power laser beam having a high energy;

a low-power laser, configured to generate a low-power laser beam having a low energy that is less than the high energy;

a target patch, configured to be affixed to the part;

a beam-aiming optic, configured to receive the low-power laser beam from the low-power laser and receive the high-power laser beam from the high-power laser;

an optical sensor; and an electronic controller operably coupled with the high-power laser, the low-power laser, the beam-aiming optic, and the optical sensor, and configured to control:

the low-power laser to generate the low-power laser beam;

the beam-aiming optic to move the low-power laser beam, received from the low-power laser beam, along the part until the optical sensor detects a reflected portion of the low-power laser beam reflected off of the target patch;

the beam-aiming optic such that, when the beam-aiming optic receives the high-power laser beam from the high-power laser, the high-power laser beam is directed at the detected location of the target patch; and the high-power laser to generate the high-power laser beam.

15. The laser bond inspection system according to claim 14, wherein the electronic controller is configured to control the beam-aiming optic such that spatial parameters of the beam-aiming optic, relative to the part, when the optical sensor detects the reflected portion of the low-power laser beam, and when beam-aiming optic receives the high-power laser beam, are the same.

16. A method of laser bond inspecting a part, the method comprising:

affixing a target patch to the part at a location to be inspected;

directing a low-power laser beam, having a low energy, off of a beam-aiming optic at the part;

moving the low-power laser beam along the part, via adjustment of the beam-aiming optic, until the low-power laser beam retro-reflects off of the target patch;

detecting a reflected portion of the low-power laser beam reflected off of the target patch at an optical sensor; and aiming a high-power laser beam, having a high energy higher than the low energy, at the target patch using the beam-aiming optic.

17. The method according to claim 16, wherein:

the low-power laser beam reflects off of a retro-reflective portion of the target patch; and the method further comprises:

transmitting the high-power laser beam through a tamping portion of the target patch; and absorbing the high-power laser beam, transmitted through the tamping portion, in an ablative portion of the target patch.

18. The method according to claim 16, further comprising:

detecting a distance from the detected location of the target patch to the optical sensor; and adjusting an energy level of the high-power laser beam based on a detected distance from the detected location of the target patch to the optical sensor.

19. The method according to claim 16, wherein:

the beam-aiming optic comprises an adjustable mirror;

moving the low-power laser beam along the part until the low-power laser beam retro-reflects off of the target patch comprises adjusting a spatial parameter of the adjustable mirror to have a final spatial parameter value; and aiming the high-power laser beam comprises reflecting the high-power laser beam off of the adjustable mirror when the adjustable has the final spatial parameter value.

20. The method according to claim 16, wherein aiming the high-power laser beam comprises directing the high-power laser beam along a high-power-laser beam path that is collinear with a low-power-laser beam path of the low-power laser beam when the low-power laser beam is reflected off of the target patch.

\* \* \* \* \*